United States Patent
Boulais et al.

(10) Patent No.: US 8,856,780 B2
(45) Date of Patent: Oct. 7, 2014

(54) METHOD AND SYSTEM TO REMOTELY FLASH AN EXTERNAL MODULE

(75) Inventors: Sebastien Boulais, McMasterville (CA); Franco Barassi, Montreal (CA)

(73) Assignee: Automotive Data Solutions Inc., Montreal, Quebec (CA)

( * ) Notice: Subject to any disclaimer, the term of this patent is extended or adjusted under 35 U.S.C. 154(b) by 304 days.

(21) Appl. No.: 13/304,592

(22) Filed: Nov. 25, 2011

(65) Prior Publication Data

US 2013/0139149 A1 May 30, 2013

(51) Int. Cl.
*G06F 9/445* (2006.01)

(52) U.S. Cl.
CPC ..................................... *G06F 8/665* (2013.01)
USPC ........................................................ 717/178

(58) Field of Classification Search
CPC ....................................................... G06F 8/665
USPC ........................................................ 717/178
See application file for complete search history.

(56) References Cited

U.S. PATENT DOCUMENTS

| | | | | |
|---|---|---|---|---|
| 5,237,610 A | * | 8/1993 | Gammie et al. | 380/228 |
| 5,438,315 A | * | 8/1995 | Nix | 340/539.11 |
| 5,859,911 A | * | 1/1999 | Angelo et al. | 713/187 |
| 6,223,284 B1 | * | 4/2001 | Novoa et al. | 713/100 |
| 7,711,951 B2 | * | 5/2010 | Chao | 713/156 |
| 8,353,033 B1 | * | 1/2013 | Chen et al. | 726/22 |
| 2002/0029254 A1 | * | 3/2002 | Davis et al. | 709/217 |
| 2004/0088697 A1 | * | 5/2004 | Schwartz et al. | 717/174 |
| 2005/0154875 A1 | * | 7/2005 | Chao | 713/156 |
| 2009/0025074 A1 | * | 1/2009 | Le Saint et al. | 726/9 |
| 2012/0036551 A1 | * | 2/2012 | Le Saint et al. | 726/1 |

\* cited by examiner

*Primary Examiner* — John Chavis
(74) *Attorney, Agent, or Firm* — Robert Brouillette

(57) ABSTRACT

A method to remotely flash an external module comprises the steps to electronically transfer a computer program from a computer device to an external module, to partially install the external module to a vehicle, to extract the key data from a device securing the vehicle, to transfer the key data to a computer, to analyze and process the key data with a computer program generating a new computer program allowing the external module to communicate with the security device, to transfer the generated computer program to the external module, to complete the installation of the external module to the vehicle.

20 Claims, 2 Drawing Sheets

METHOD AND SYSTEM TO REMOTELY FLASH AN EXTERNAL MODULE

CROSS-REFERENCE TO RELATED APPLICATIONS

There are no cross-related applications.

BACKGROUND OF THE INVENTION

Within the last two decades, many innovations and technologies have been developed to reduce the likelihood of a vehicle getting stolen. As an example, immobilizers have been added to cars, such device allowing a vehicle to start only if a chip is present within a certain range of the vehicle. Such immobilizers usually make use of transponder systems that require the presence of a RFID transponder within a certain range for the engine to run or the door to be unlocked.

These new technologies have significantly increased the security of a car to the detriment of the manufacturers of remote starter apparatuses. Consequently, in order to allow a remote starter to work, a bypass module must be installed within the car. The bypass module uses any communication method in order to request the starting of the engine of the car. However, the new technologies, such as the transponder, requires a key having a RFID or at least a transponder chip comprising a RF loop to be present within the car. This solution provides the advantage of allowing an external module such as a remote starter apparatus to work seamlessly for the user. On the other side, it reduces the security level of the car since the key or chip with RF loop could be used by a potential thief to start the engine once the thief breaks into the car.

Thus, there is a need for a system and/or a method allowing an external module being able to request the starting of the engine to be installed within a car. Such system or method shall not decrease the security for the owner of the car.

SUMMARY OF THE INVENTION

The aforesaid and other objectives of the present invention are realized by generally providing a method to remotely flash an external module to ease the installation of an external device by a customer of an external device or by an external device installer.

A method to remotely flash an external module generally comprises the steps to electronically transfer a computer program, such as a firmware or a software, from a computer device to an external module, to install the external module to a vehicle, to extract the key data from a device securing the vehicle using a computer program, to transfer the key data to a computer, to analyze and process the key data with a computer program thereby generating a new computer program allowing the external module to communicate with the security device and to transfer the generated computer program to the external module.

The system to remotely flash an external module comprises an external module, a secured physical location, a computer, a computer program, a data source, a communication method between the external module and the physical location securing device and a communication method between the external module and the computer such as a USB cable, the TCP/IP protocol or any other electronic communication apparatus.

The features of the present invention which are believed to be novel are set forth with particularity in the appended claims. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Novel method and system to remotely flash an external module will be described hereinafter. Although the invention is described in terms of specific illustrative embodiments, it is to be understood that the embodiments described herein are by way of example only and that the scope of the invention is not intended to be limited thereby.

A method to remotely flash an external module 100 eases the installation of an external device by a customer of an external device or by an external device installer. In a preferred embodiment, the physical location to be secured is embodied by a vehicle. In another embodiment, any physical location, such a house or an office, secured by a security device and where control must be gained shall benefit from the usage of a method to remotely flash an external module.

Figure 1:
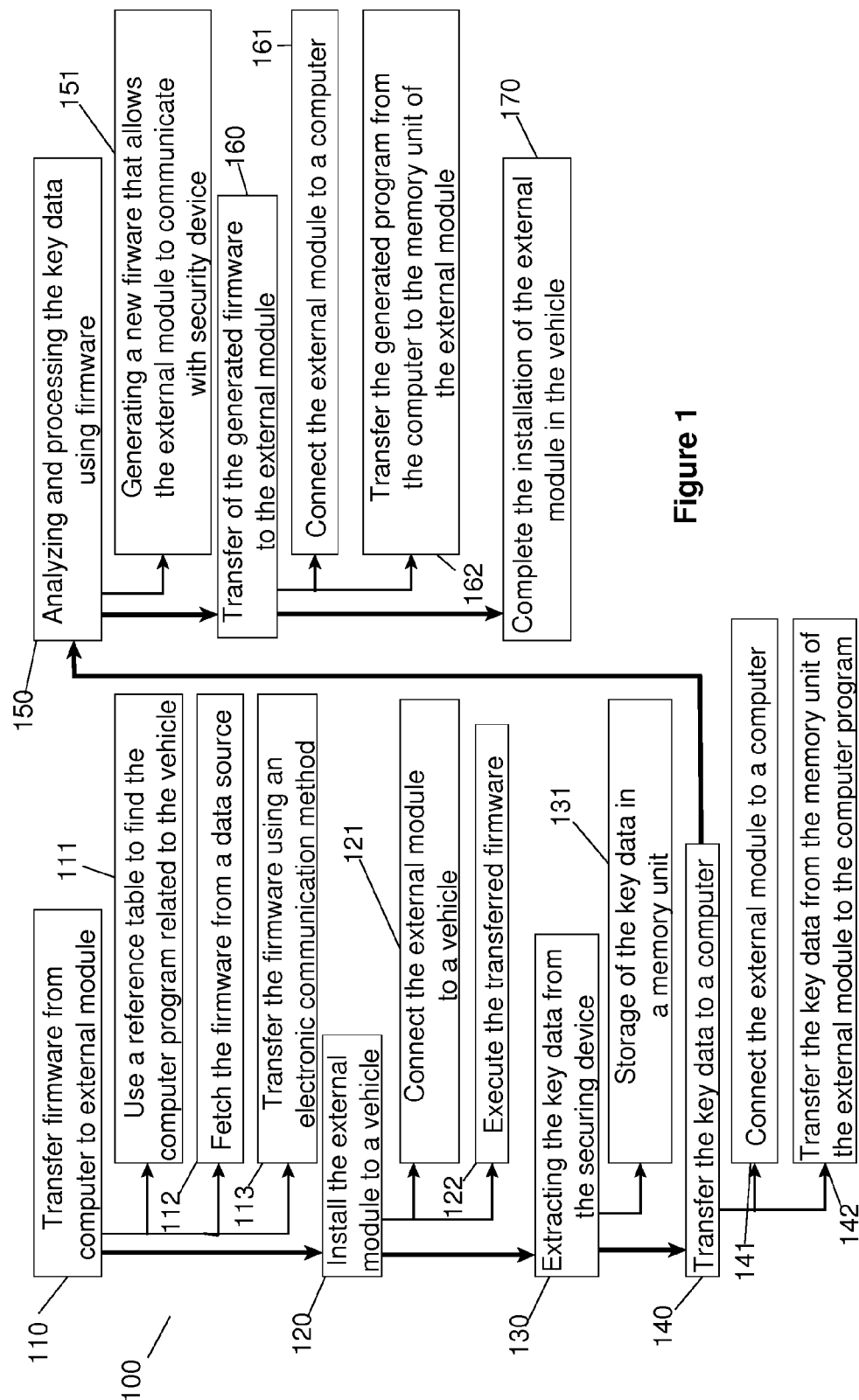
FIG. 1 is a workflow diagram presenting the different steps of a method to remotely flash an external device in accordance with the principles of the present invention.

Referring to FIG. 1, a method to remotely flash an external module is presented. The method to remotely flash an external module comprises the steps to electronically transfer a computer program, such as a firmware or portable software, from a computer device to an external module 110, to install the external module into a vehicle 120, to extract the key data from a device securing the vehicle 130, to transfer the key data to a computer 140, to analyze and process the key data with a computer program in order to generate a new computer program allowing the external module to communicate with the security device 150 and to transfer the generated computer program to the external module 160.

Still referring to FIG. 1, the step to electronically transfer a computer program from a computer device to an external module 110 comprises the steps to use a reference table to find the computer program related to the vehicle to be secured in which the external module must be installed 111, to fetch, retrieve or order the computer program from a data source or to use calculations to obtain the computer program 112 and to transfer the computer program using an electronic communication method 113 such as using a computer network transfer protocol or a communication cable, such as a RS-232, USB or Firewire™ cable. The reference table may be an electronic or physical document or be embodied as a searchable data source such as a database, XML file or any other searchable data container. To ensure optimize performances, it shall be noted by the skilled addressee that reference table shall be indexed. The computer program may be retrieved the computer program from the data source through a computer program using client-server architecture or through a browser accessing a web-based application. The data source may be any type of database, such as an XML file, a pre-compiled table, a graphical card having GPU, an array of FPGA or a cloud-based storage.

The installation of the external module to a vehicle 120 comprises the steps to connect the external module to a vehicle 121 and to execute the transferred computer program 122. A vehicle being different from one manufacturer to the other and from a model to another, the specific connection method must be executed for a specific technology, manufacturer, or model. The execution of the transferred computer program on the external device allows the extraction of the key data from a device securing the vehicle 130 and the acquiring and storage of the key data in a memory unit comprised in the external module 131.

The step to transfer the key data to a computer 140 comprises the steps to connect the external module to a computer 141, to electronically transfer the key data from the memory unit of the external module to the first computer program using an electronic communication method 142 such as using a computer network transfer protocol such as TCP/IP, wireless signal, such as WiFii, or a communication cable, such as a USB or Firewire™ cable.

Upon transferring the key data, the computer analyzes and processes the key data using a second computer program 150. Using the key data and the information related to the manufacturer and/or model of the vehicle as input, the second computer program generates a third computer program that allows the external module to communicate with the security device of the vehicle 151. In another embodiment, it may be required to manually enter additional information, such as an identification number, a serial number or any unique identification information, to allow the second computer program to generate a third computer program.

In another embodiment, the second computer program may be located within the external device.

The transfer of the third computer program to the external module 160 comprises the steps to connect the external module to a computer 161, to electronically transfer the third program from the computer to at least one memory unit of the external module using an electronic communication method such as using a computer network transfer protocol such as TCP/IP, wireless network or a communication cable, such as a USB or Firewire™ cable 162. and to disconnect the external module from the computer.

In another embodiment, the step to install the external module into a vehicle 120 may be replaced by a step to partially install the external module into a vehicle. In this embodiment, it will then be required to disconnect external module after step 131 and after the step 162. This step may be required in the event where the external module must be physically wired to a computer in order to transfer the key data 140. In this embodiment, a last step to complete the installation of the external module into the vehicle 170 shall be required.

The step to complete the installation of the external module to a vehicle 170 requires the connection of the external module to a vehicle. The connection to a vehicle being different from one manufacturer to the other and from a model to another, the connection method related to a manufacturer or a specific model must be executed to complete the connection.

Upon completion of the method 100, a vehicle having a device securing the starting of the engine or the door opening may be securely by-passed by an external module.

Figure 2:
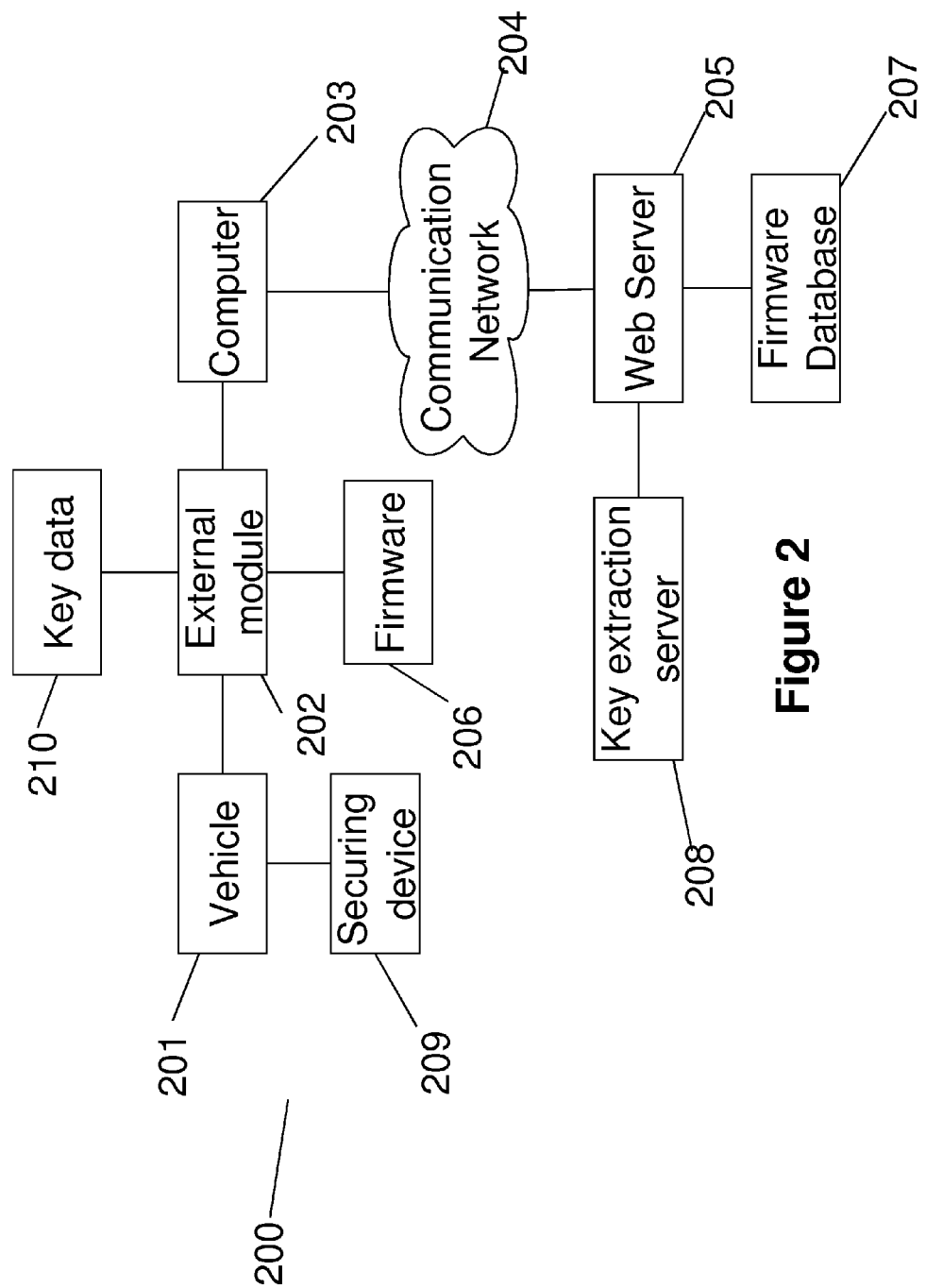
FIG. 2 is a schematic diagram of a system for remotely flashing an external module in accordance with the principles of the present invention.

Now referring to FIG. 2, a system 200 to remotely flash an external module is shown. The system 200 comprises an external module 202 installable in a vehicle 201 having a securing device 209, a computer 203, a computer program 206 such as a firmware or any portable software, configured to be compatible with the external module 202, a data source 207, a communication method between the external module and the vehicle securing device 209, a communication method between the external module and the computer such as a USB cable, the TCP/IP protocol or any other electronic communication apparatus, a web server 205, a key extraction server 208 and a communication network such as Internet, LAN or WAN between the computer 203 and the web server 205.

The external module 202 comprises at least one communication port and at least one rewritable memory unit. Additionally, the external module may comprise a microprocessor or any microchip allowing the execution of a computer program.

In the present embodiment, a web application is executed on a web server 205. The web server 205 communicates the received key data 210 to the key extraction server 208. The key extraction server 208 is configured to extract the key from the key data 210 and to generate a computer program, such as a firmware, to be transferred to the external module 202.

Still referring to FIG. 2, a computer 203 comprises at least one memory unit device, at least one microprocessor and at least one I/O device such as network card and communication port, such as USB, RS-232, TCP/IP, wireless or Firewire™ port. The computer 203 accesses the web server 205 through a communication method 204, such as an Internet protocol, a web-service or any remote call procedure. The computer 203 may be configured to access a reference table or data source 207 of computer programs 206 per car model or manufacturer. The web server 205 is compiled and configured to access and fetch the database based on input parameters such as manufacturer, model or physical location securing device model. The key extraction server 208 is configured to generate a computer program 206 based on the information retrieved from the data source 207. Such generated computer program 206 allows the bypass of the securing device 209 on a secure request.

The vehicle securing device 209 may be embodied as a car anti-theft apparatus, a physical location alarm system or a firewall.

The data source 207, such as a relational database, a pre-compiled table, one or more graphic card having a graphical processor unit, an array of FPGA, any cloud-based data source or an XML file, is structured to store the data required to generate the computer program and may make use of indexation information such as the manufacturer, the model and the specifications of the model to optimize the performance of the data source 207.

The communication method between the external module 202 and the computer 203 allows the transfer of data from and to the external module 202. The transfer of the data may comprise the methods to upload the key data 210 to the computer program or the transfer of the generated computer program from the computer 203 to the external module 202. The communication method between the external module 202 and the vehicle securing device 209, such as the use of a protocol over a physical cable or a wireless signal or the connection to the database of the vehicle securing device, allows, as previously described, the key data 210 to be transferred to the external module202.

In another embodiment, the computer 203 may have a direct access to a reference table 207 or may manually fetch and retrieve the computer program 206 using a portable medium such as CDROM, USB stick or any portable storage device without requiring an access to a communication network 204. For example, one may communicate the key data 210 or the external module 202 to a third party using any communication method, such as email, mail or courier. The third party receiving the key data 210 or external module 202 would then generate a computer program 206 using a key extraction server 208 and return the key data 210 or external module 202 using the same or a different communication method.

In another embodiment, the web server 205, key extraction server 208, the computer 203 and the data source 207 may installed or located on the same physical machine or on a plurality of physical machines.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. A method to remotely flash an external module, the method comprising:
   a. electronically transferring a first computer program from a computer device to the external module;
   b. at least partially installing the external module to a vehicle;
   c. extracting key data from a security device located in the vehicle using the first computer program;
   d. transferring the key data to the computer device;
   e. using a second computer program not installed on the external module, analyzing and processing the key data and generating a third computer program allowing the external module to communicate with the security device;
   f. transferring the generated third computer program to the external module.

2. A method to remotely flash an external module according to claim 1, wherein the external module is connected with the computer using a cabled communication method and wherein the method further comprises the steps to install the external module into the vehicle.

3. A method to remotely flash an external module according to claim 1, wherein the step to generate a third computer program requires the manual entry of additional information.

4. A method to remotely flash an external module according to claim 1, wherein the step to electronically transfer a first computer program from a computer device to the external module comprises:
   a. using a register table to find the first computer program related to the vehicle in which the external module must be installed;
   b. fetching the founded first computer program from a data source;
   c. transferring the first computer program to the external module using an electronic communication method.

5. A method to remotely flash an external module according to claim 4, wherein the first computer program is generated through calculations.

6. A method to remotely flash an external module according to claim 4, wherein the electronic communication method comprises the step of connecting communication cable between the external module and the computer device.

7. A method to remotely flash an external module according to claim 4, wherein the electronic communication method comprises the step of connecting a USB cable between the external module and the computer device.

8. A method to remotely flash an external module according to claim 4, wherein the electronic communication method comprises the step of connecting a RS-232 cable between the external module and the computer device.

9. A method to remotely flash an external module according to claim 4, wherein the electronic communication method is a wireless communication method.

10. A method to remotely flash an external module according to claim 1, wherein the step to partially install the external module in a vehicle comprises:
    a. connecting the external module to the vehicle;
    b. executing the first computer program to acquire and store the key data within a memory unit of the external module.

11. A method to remotely flash an external module according to claim 1, wherein the step to transfer the key data to the computer device comprises:
    a. connecting the external module to the computer device fetching the first computer program from the data source;
    b. electronically transferring the key data from a memory unit of the external module to a computer device using an electronic communication method.

12. A method to remotely flash an external module according to claim 11, wherein the communication method to transfer the key data to the computer device comprises the step of connecting a communication cable between the external module and the computer device.

13. A method to remotely flash an external module according to claim 11, wherein the communication method to transfer the key data to the computer device is a wireless communication method.

14. A method to remotely flash an external module according to claim 1, wherein the step to transfer the generated third computer program to the external module comprises:
    a. connecting the external module to the computer device;
    b. electronically transferring the generated third program from the computer device to a memory unit of the external module using an electronic communication method.

15. A system to remotely flash an external module, the system comprising:
    a. an external module installable in a vehicle having at least one securing device;
    b. a key extraction server configured to extract a key from key data;
    c. at least one computer, wherein the at least one computer is configured to:
       i. generate a new computer program based on:
          (1) information retrieved from a data source of computer programs;
          (2) the key data;
       ii. access the data source;
    d. a computer program configured to be compatible with the external module;
    e. a first communication method allowing a connection between the external module and the at least one vehicle securing device;
    f. a second communication method between the external module and a computer device;
    g. a communication network between the computer device and the at least one computer.

16. A system to remotely flash an external module according to claim 15, wherein the computer program is a firmware.

17. A system to remotely flash an external module according to claim 15, wherein a reference table is stored within the data source.

18. A system to remotely flash an external module according to claim 15, wherein the second communication method between the external module and the computer uses a USB communication cable connected between the external module and the computer.

19. A system to remotely flash an external module according to claim 15, wherein the second communication method between the external module and the computer is a wireless communication method.

20. A system to remotely flash an external module according to claim 15, wherein the at least one computer is a web server.

* * * * *